United States Patent [19]

Lackner

[11] Patent Number: 5,043,995
[45] Date of Patent: Aug. 27, 1991

[54] PROCESS TO ELECTRICALLY EXCITE A LASER GAS

[75] Inventor: Wilfried Lackner, Munich, Fed. Rep. of Germany

[73] Assignee: Messer Griesheim, Fed. Rep. of Germany

[21] Appl. No.: 373,947

[22] Filed: Jun. 28, 1989

[30] Foreign Application Priority Data

Jul. 1, 1988 [DE] Fed. Rep. of Germany ....... 3822229

[51] Int. Cl.$^5$ .............................................. H01S 3/097
[52] U.S. Cl. ...................................... 372/82; 372/85; 372/58; 372/64
[58] Field of Search .................. 372/69, 82, 83, 55, 372/58, 85, 64

[56] References Cited

U.S. PATENT DOCUMENTS

| | | | |
|---|---|---|---|
| 4,456,912 | 2/1984 | Ensley | 342/54 |
| 4,573,162 | 2/1986 | Bakowsky et al. | 372/58 |
| 4,706,257 | 11/1987 | Brunet et al. | 372/58 |
| 4,780,881 | 10/1988 | Zhang et al. | 372/92 |
| 4,800,567 | 1/1989 | Karube | 372/88 |
| 4,802,184 | 1/1989 | Karube | 372/82 |
| 4,807,236 | 2/1989 | Martinen et al. | 372/82 |
| 4,835,446 | 5/1989 | Nation et al. | 315/5.13 |

Primary Examiner—Léon Scott, Jr.
Attorney, Agent, or Firm—Connolly & Hutz

[57] ABSTRACT

The invention relates to a process to electrically excite a laser gas, especially a $CO_2$—He—$N_2$ mixture, which is admitted at an angle, preferably perpendicular, to the axial laser gas discharge gap, and which is ignited by means of bunched microwaves. In order to avoid the formation of wall boundary layers during the microwave excitation of a laser gas and in order to achieve a homogeneous, large-volume glow discharge, the microwaves are axially bunched into the laser gas discharge gap in the area of the laser gas inlet so that the microwaves and the ignited laser gas spread over the axial laser gas discharge gap.

16 Claims, 4 Drawing Sheets

PROCESS TO ELECTRICALLY EXCITE A LASER GAS

BACKGROUND OF INVENTION

The invention relates to a process to electrically excite a laser gas, especially a $CO_2$-He-$N_2$ mixture, which is admitted at an angle, preferably at a perpendicular angle, to the axial laser gas discharge gap, and which is ignited by means of bunched microwaves.

Laser light is often generated by means of light reinforcement from stimulated emission in an optical resonator, consisting of at least two mirrors and a laser-active medium. The laser-active medium is made up of excited atomic systems; in the case of the $CO_2$ laser, it consists of $CO_2$ molecules.

The excitation often occurs by means of an electric discharge. When this discharge is ignited, the electric field strength inside the discharge tube must take on substantially higher values than those that are necessary to maintain the discharge plasma. When microwaves strike the laser gas which has not yet been excited, the laser gas ignites if the field strength is sufficient, thus creating a plasma zone. This plasma zone absorbs the microwaves, additional electrons are formed and the plasma zone expands until, at a certain electron density, the so called cut-off density, almost all of the microwaves are reflected by the plasma in the direction of the microwave transmitter. In this process, the electric field strength between the transmitter and the plasma grows, and the plasma expands further in the direction of the microwave transmitter. This process continues until the microwaves have reached the wall of the tube or the microwave inlet window.

The cut-off density, which is important for the onset of reflection, is a function of the microwave frequency and the collision frequency between electrons and molecules. When this cut-off density is reached, a final state is achieved in which the microwaves are totally absorbed in the wall boundary layer and can no longer penetrate into the discharge space. The wall boundary layer heats up more and more, often causing damage to the dielectric discharge tube and to the microwave window.

It can be seen in the publication, "Schock, W., Laser Symposium 1985, 13 DFVLR (West German Research and Experimental Institute for Aviation and Aerospace) Institute for Technical Physics" that a highly absorbent wall boundary layer with a high electron density forms in the discharge gap of gas lasers during microwave excitation, normally rendering the laser operation inefficient. In order to avoid the wall boundary layer, the West German Research and Experimental Institute for Aviation and Aerospace (DFVLR, Institute for Technical Physics) has taken the approach of bunching the microwaves in a jet flow with a high pressure differential. As a result of the build-up of high pressure behind the dielectric window, ignition in this area is avoided. The ignition of the laser gas occurs in the low-pressure range behind the jet. A maximum continuous $CO_2$-laser power of 340 W, with an efficiency rate of 7%, can be achieved with a microwave power of 4.75 kW. Since the laser gas flows in the propagation direction of the microwaves and since the resonator is perpendicular to the laser-active medium, which is being formed non-homogeneously, and the resonator only comprises a part of the medium, the efficiency rate of this arrangement is low. The entire system is very complex and expensive because of the large mass flow required and because of the high pressure differentials.

In the "Journal of Applied Physics" 49 (7) July 1978, an article titled "Laser-generation by pulsed 2.45 gHz microwave excitation of $CO_2$" by Handy and Brandelik, pages 3753 to 3756, describes a process for the microwave excitation of a gas laser, which produces a gas laser of a similar class. With this gas laser, the microwaves penetrate the laser gas perpendicular to the flow of the laser gas, which flows into a discharge tube inlet positioned at a perpendicular angle to the microwave buncher and which flows out at a discharge tube outlet positioned perpendicular to the microwave buncher. On the basis of this configuration of the arrangement, the heated-up plasma collects along the dielectric discharge tube wall and forms a highly absorbent wall boundary layer. This leads to a low rate of efficiency of the gas laser and requires a cooling system with nitrogen that is pre-cooled to 200 K.

SUMMARY OF INVENTION

The invention is based on the object of avoiding the formation of the above-mentioned wall boundary layer during microwave excitation of a laser gas, and on the object of achieving a homogeneous, large-volume glow discharge.

This object is solved by the invention in that the microwaves are bunched axially into the laser gas discharge gap in the area of the laser gas inlet, the laser gas is ignited there and the ignited laser gas spreads, together with the microwaves, in the direction of the optical axis and thus in the direction of the laser gas discharge gap. In this process, the discharge gap is moved to the place of the sealed microwave-waveguide, where the electric field has high values. The inlet and outlets for the laser gas are positioned in such a manner that the microwave field cannot escape.

Due to the advantageous bunching of the microwaves in the direction of the optical axis of the resonator, in conjunction with the fact that the laser gas admission is positioned perpendicular to the optical axis of the resonator in the embodiment of a coaxial waveguide having a length of $\lambda/4$ the incident microwaves area advantageously reflected by a short circuit and they encounter an elevated electric field strength at the tip of an ignitor located in the laser gas inlet. As a result, the ignition of the discharge can be triggered at the tip of the ignitor. A plasma is formed at the free end of the ignitor, and this plasma is advantageously transported into the laser gas discharge gap by the flow. The plasma transported into the discharge gap then advantageously absorbs the microwaves in the center of the discharge, not near the walls, and it sustains the excitation process. If the waveguide is appropriately shaped, it is possible to curtail the power drop and the field drop in the flow direction associated with the microwave absorption.

As a result of selecting the cross-section dimensions of the sealed waveguide in such a manner that the wave length of the microwaves is much greater than twice the length of the discharge gap, it is advantageously achieved that the electric excitation in the flow direction remains virtually constant. For this purpose, the width of the waveguide is reduced to the cutoff width for rectangular waveguides, whereas it is reduced to the cut-off diameter for round waveguides.

The cut-off width corresponds to half the wave length of the microwaves in a free space; the cut-off diameter is 0.58 times the wave length of the microwaves in a free space.

Due to the fact that the laser gas discharge gap coincides with the optical axis of the resonator, the entire volume of excited laser gas is in the optical resonator. By optimizing the laser, a homogeneous discharge is created, which is advantageously distributed over the entire cross section of the laser beam.

By using inexpensive microwave transmitters, especially by the advantageous use of microwave oven transmitters to excite the gas laser, the operation of this laser becomes more effective, environmentally safer and more economical. Due to the high efficiency of the microwave transmitter and since there are no load resistances, the system is highly efficient. The efficiency rate of this gas laser, which is excited in the microwave range, reaches values of up to 30%. In this process, in order to achieve a higher power density and to simplify the gas circulation, the pressure in the discharge gap can be set at higher values than is possible with direct-current or high-frequency excitation. An advantageous aspect is that a microwave transmitter with a high electric efficiency can be used, while the components needed for the ignition process are inexpensive. It is also advantageous that the laser gas circulation system has only a low flow resistance because of its compact design and its special gas inlet, thus simplifying the circulation of the gas. No high-power circulation pumps, which generate a great deal of noise, are needed. It is advantageous that there is no danger of high-voltage, since the housing of the transmitter is grounded and no components carrying high-voltage can be touched directly; moreover, the high-voltage rate is five times lower than in direct-current lasers of a similar design. With a microwave-excited gas laser according to the invention output power levels up to the multi-kilowatt range can be achieved. The microwave-excited gas laser can function advantageously in either a continuous or in a pulsed mode of operation. In pulsed operation, there is a simple technique to create a pulse excess in the form of a super-pulse. In the present embodiment, the invention is described with reference to a preferably used highpower laser. The term high-power laser is used here to designate a laser which can be preferably used to process material, especially to weld, cut, perforate or to apply a surface finish to materials. The laser medium used is a fast flowing helium-carbon dioxide nitrogen mixture, which burns after ignition at a pressure of, for example, 50 millibar. Of course, the process and the device according to the invention can also be favorably used for lasers that work in the infrared range of the spectrum, for example, CO, HCN or HF gas lasers at corresponding pressure ranges.

In an advantageous embodiment of a gas laser with a fast axial flow, the discharge module consists of a waveguide containing the laser-active zone, preferably positioned in the reaction of the optical laser axis, in which the laser gas, preferably in the area of the microwave buncher, flows in at an angle to the optical axis, preferably at a right angle, and in which the laser gas, when it leaves the laser-active zone, flows out at an angle to the optical axis, preferably at a right angle. The place of the microwave buncher in the resonator is characterized by a microwave window, preferably by a mirror that is highly reflective with respect to laser radiation but that is transparent with respect to microwaves, preferably a dielectric end mirror or deviation mirrcu, preferably made, for example, of zinc selenide (ZnSe), gallium arsenide (GaAs) or silicon (Si), which separates the area of lower pressure in the resonator from the area of the ambient pressure. In the area of the ambient pressure of the microwave window, the waveguide continues—inclined towards the optical laser axis and preferably coaxially to this laser axis—via microwave adapter elements to the bunching place of the microwave by means of at least one microwave transmitter. As a result of the preferably axial arrangement of the discharge module and the microwave transmitter, i.e. the waveguide and of the resonator axes coincide, a compact structure is achieved for the microwave-excited gas laser. Special advantages arise in conjunction with this arrangement of the microwave transmitter and the resonator along a lengthwise axis, for example, when the waveguide is designed as a resonator to bunch the microwaves.

In order to shield the microwaves to the outside, an electrically sealed coaxial waveguide is provided as the gas inlet. In addition, in order to shape the flow, an ignitor has a dielectric body that is designed in such a way that, on the one hand, the cross section of the coaxial waveguide for the flow is not narrowed too much and, on the other hand, a flow having eddies is generated in the dielectric discharge tube.

The expression coaxial waveguide refers to a waveguide with electrically conductive sheathing with, for example, a rectangular or round cross section, in which an inner conductor is located.

In an advantageous embodiment of the type having a fast axial flow, there is a preferably dielectric discharge tube with an L-branch positioned concentrically within the waveguide, and the tube inlet for the laser gas extends into the coaxial waveguide which has, for example, a round cross section.

By positioning a dielectric discharge tube inside the waveguide, the excited laser gas is enclosed in a defined manner. By positioning a flexible seal between the coaxial waveguide and the inlet of the dielectric discharge tube, an advantageous sealing with respect to the higher ambient pressure is achieved.

In an advantageous embodiment, the coaxial waveguide, which at the same time serves as the gas inlet, has a length corresponding to $\frac{1}{4}$ of the wave length in the coaxial waveguide and, at the electrically sealed end of the coaxial waveguide, the short circuit is shaped as a metal ignitor holder, which allows the necessary gas throughput, shields the microwave to the outside and holds at least one ignitor. The insertion depth of the ignitor is advantageously adjustable in the coaxial waveguide and preferably has a larger diameter at the electrically sealed end than at its free end. In this process, the larger diameter of the ignitor facing the short circuit advantageously determines the microwave energy penetrating the coaxial waveguide, whereas the end with the smaller diameter determines the ignition field strength. The ignition field strength is optimized by adjusting the insertion depth of the ignitor.

The dielectric flow body is designed advantageously in such a manner that the flow cools the wall zone of the bunching area, generates an eddy near the ignitor which promotes ignition and, by means of turbulence in the dielectric discharge tube, achieves homogenization of the temperature profile.

Due to the fact that the width of the rectangular waveguide is reduced to approximately the dimensions of the above-mentioned cut-off width by means of wedge-shaped metal inserts, the wave length of the microwaves is advantageously increased within the waveguide when the electric field is increased so that, on the one hand, wall boundary layers in the direction of the resonator can be prevented and, on the other hand, the wedge-shaped inserts compensate for the power drop in the rear section caused by the preceding absorption of the microwaves and they also compensate for the field strength reduction caused by this power drop.

Due to the fact that there are also profiled metal bars of defined dimensions to shape the electric field on the inner wall of the wide side of the rectangular waveguide and that the metal bars have a smaller width than the diameter of the discharge tube, it is possible to advantageously avoid wall boundary layers in the direction perpendicular to the resonator. The electric field is strengthened and centered in the middle of the discharge tube.

In another advantageous embodiment, it is proposed to use a cylindrical waveguide without a dielectric discharge tube directly as a discharge space. As a result, a simpler, less expensive structure is achieved whose metallic outer surface area can be cooled with a fluid, for example, with water. In this process, the low-pressure range of the discharge space is advantageously sealed vacuum-tight with a dielectric window which is transparent for microwaves and which, at the same time, constitutes a highly reflective mirror for laser radiation. In order to prevent ignition at the low-pressure side behind the mirror, the space directly behind the window should be larger than the dimensions of the rectangular waveguide for the bunching of the microwaves. Moreover, by adjusting the above-mentioned impedance-adjusted waveguide gap, it must be assured that a low field is present on the side of the window facing the low-pressure.

In another advantageous embodiment, the laser gas flows in and out transversely through most of the laser gas discharge gap, whereby the microwaves that penetrate the laser gas inlet, which is also designed as a coaxial waveguide here, are reflected from a short circuit, and they generate an electric ignition field strength over the entire laser gas discharge gap in the area of several ignitors, where the laser gas is fed into the discharge gap. By means of this process, the gas laser can be advantageously operated at low flow speeds with the same heat dissipation. Advantageously, there are only slight flow losses during circulation. Fans can be used that generate only a slight pressure difference.

THE DRAWINGS

FIG. 1 is a schematic representation of a longitudinal section of a discharge module of the microwave-excited gas laser with an axial flow, which functions in a continuous or pulsed mode of operation and which has an axial microwave buncher; this gas laser is equipped with a rectangular waveguide and a dielectric discharge tube to hold the discharge gap, with a coaxial waveguide having an ignitor and an ignitor holder as the inlet for the gas flow, and with a microwave transmitter;

FIG. 2 is a cross section through the rectangular discharge gap according to FIG. 1 with two profiled metal bars and an adjustable, impedance-adjusted waveguide for the connection of the microwave transmitter;

FIG. 3 is a longitudinal section of a discharge tube of the microwave-excited gas laser having an axial flow, which functions in a continuous or pulsed mode of operation, consisting of a cylindrical waveguide to directly hold the microwave-excited laser gas discharge with a tangential gas inlet; and FIG. 4 is a longitudinal section through a discharge space microwave-excited gas laser having a transversal flow, which functions in a continuous or pulsed mode of operation, which has a rectangular waveguide with internally arranged profiled metal bars as the discharge space and which has a rectangular coaxial waveguide as the inlet for the gas flow and a gas outlet net made of metal.

DETAILED DESCRIPTION

Figure 1:
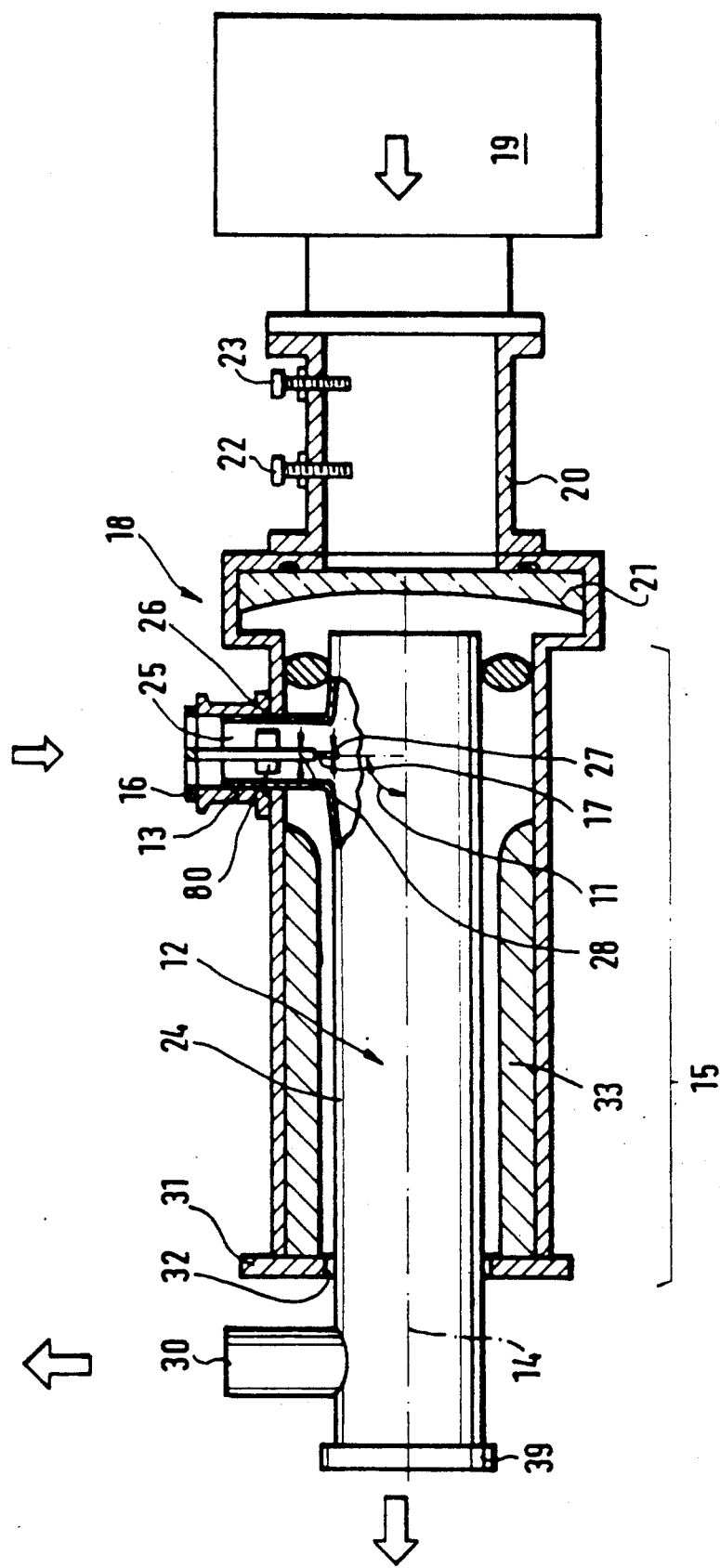
Figure 2:
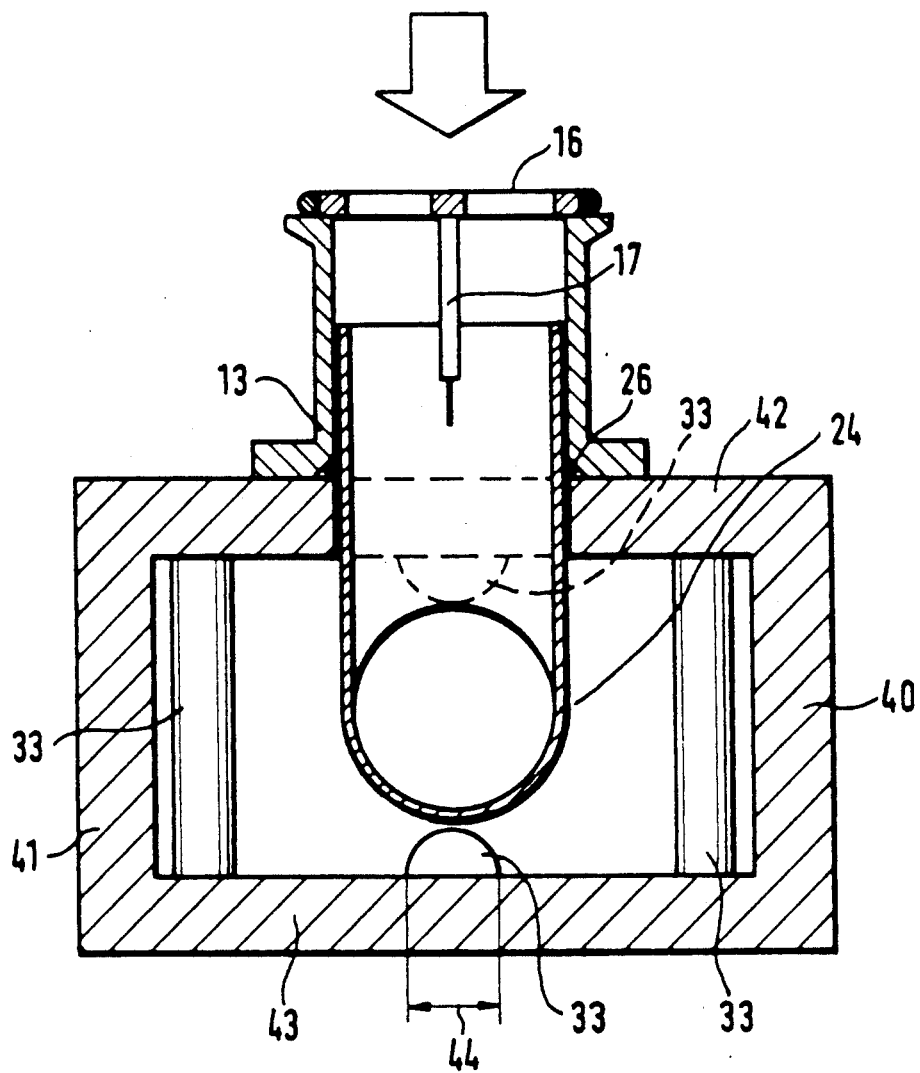

In FIG. 1, a discharge module 18 of the microwave-excited gas laser having an axial flow, which holds the laser gas discharge gap 12 located on the optical axis 14 of the resonator. The discharge module 18 has a laser gas inlet 13, which consists of an arm which is positioned at an angle 11 of preferably 90° to the laser gas discharge gap 12 and which is located at the laser gas inlet 13. A pump, which is not described here, serves to transsport the laser gas from the laser gas inlet 13 to the laser gas outlet 30. Preferably, the gas transport system is designed as a hermetically sealed laser gas circulation system.

The arm that supports the discharge module is designed as a waveguide with a rectangular or round cross-section and the laser gas inlet 13 is designed as a coaxial waveguide; in an embodiment, they serve to concentrically hold a dielectric discharge tube 24.

In the area of the branch of the laser gas inlet 13, a waveguide 20 with a rectangular cross section is connected axially to the laser gas discharge gap 12, and this waveguide is linked to the microwave transmitter 19. The microwave transmitter 19 is advantageously designed as a generally known microwave oven transmitter with a frequency of 2.45 gigahertz.

Via an antenna of the microwave transmitter 19, which is not shown here, the microwaves are radiated into the rectangular impedance-adjusted waveguide 20, which can be adjusted by means of two screws 22, 23, and the laser gas is excited in the area of the laser gas inlet 13 of the discharge module 18 by means of a deviation mirror or end mirror 21 positioned between the incident microwaves.

At its electrically sealed end, the laser gas inlet 13 is equipped with a metal short circuit 16, which is designed as the ignitor holder and which carries the dielectric flow body 80. The ignitor holder has at least one ignitor 17 that is inserted into the laser gas inlet 13. The insertion depth of the ignitor 17 into the laser gas inlet 13 is preferably adjustable and preferably has a larger diameter 27 at the end facing the short circuit 16 than at its free end 28. There is a seal 26 positioned between the laser gas inlet 13 and the inlet 25 of the discharge tube 24.

The discharge module 18, which is designed as a waveguide, is sealed with an end plate 31 at the side facing the couple-out mirror 39, and this end plate 31 prevents the microwaves from escaping. The end plate 31 has a centered opening 32 for the dielectric discharge tube 24 to pass through. On the wall 40 of the discharge module 18, which runs parallel to the laser gas inlet 13, and on the wall 41 across from wall 40, there are wedge-shaped metal inserts 33 inside the rectangular waveguide 18, which reduce the width of the waveguide 18 to almost the cut-off width. Starting at the area of the branch, the wedge-shaped metal inserts 33 run at an ascending angle towards the end plate 31, so that the wave length of the microwaves within the waveguide 18 is greater than twice the linear dimension 15 of the laser gas discharge gap 12.

There are profiled metal inserts 33 with semi-circular surfaces positioned on the walls 42, 43 of the waveguide 18 which are perpendicular to the walls 40, 41. The profiled inserts 33 have a smaller width 44 than the diameter of the discharge tube, and they run parallel to the optical axis 14 above or below the discharge tube 24.

Figure 3B:
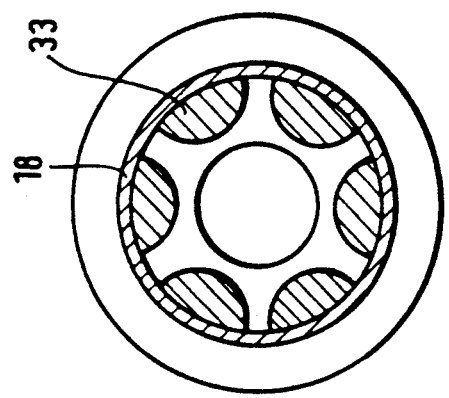
Figure 3A:
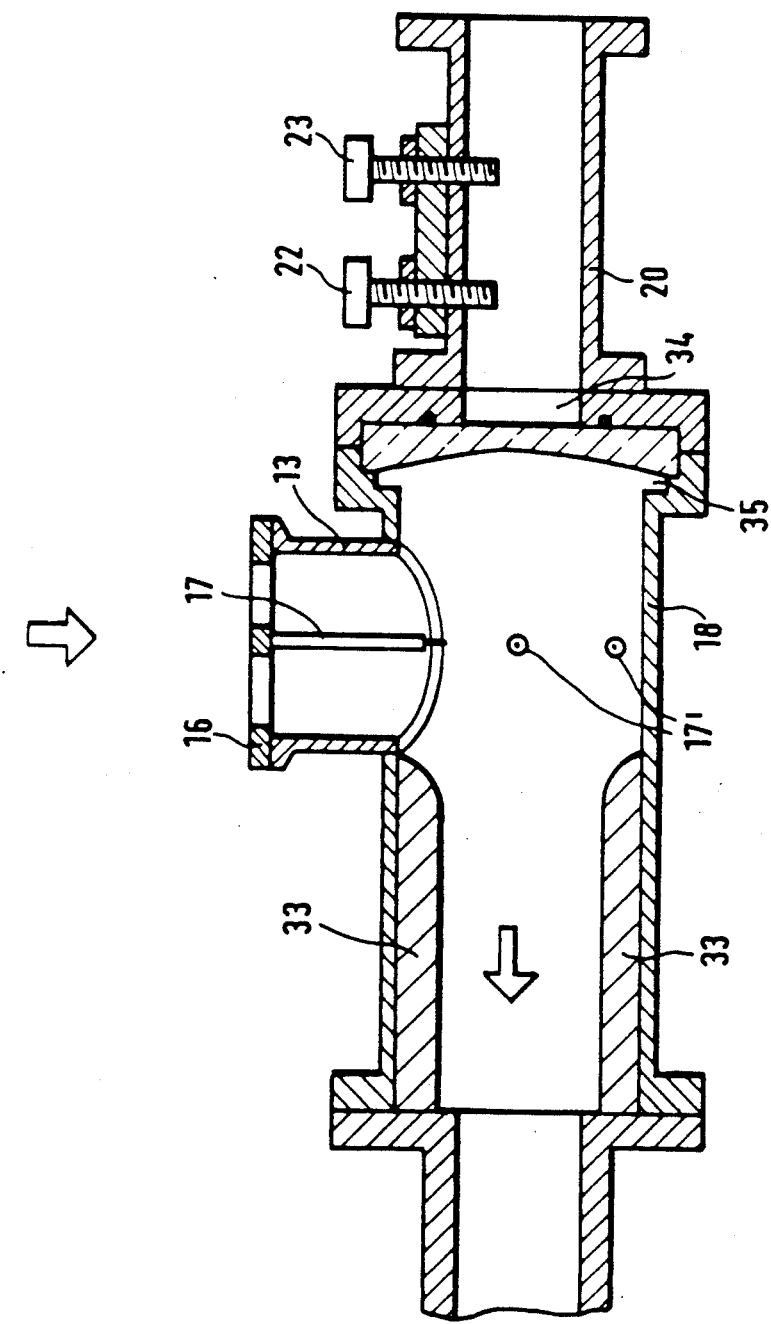

FIGS 3A and 3B show a longitudinal section of a discharge module 18 of the gas laser, consisting of a cylindrical waveguide 18 with an L-branch to directly hold the laser gas discharge gap 12. Inside the cylindrical waveguide 18, there are profiled inserts 33 to form the electric field. In order to generate a twisted flow in the microwave discharge, the laser gas inlet 13 is positioned tangentially. With this discharge module, the ignitor 17 at the gas inlet is inserted into the waveguide 18 and, together with the ignitors 17 which are positioned in the shared plane of the laser gas inlet 13 and the microwave buncher, it generates an ignition field strength to excite the laser gas. The microwaves are bunched into the discharge module, which is designed as a waveguide with a preferably round cross section, via the rectangular waveguide 20 with the impedance-adjusted waveguide gap. Between the waveguide 20 and the laser gas discharge gap 12, the low-pressure area (discharge module 18) is sealed against the atmosphere by means of a vacuum-tight seal consisting of a window 34 which is positioned in two round flanges. In order to avoid ignition at the low-pressure side directly at the window 34, the space 35 behind the window 34 facing the laser gas discharge gap 12 is larger than the cross section of the waveguide 20. It is advantageous for the window to be in the form of a deviation mirror or an end mirror of the resonator.

Figure 4:
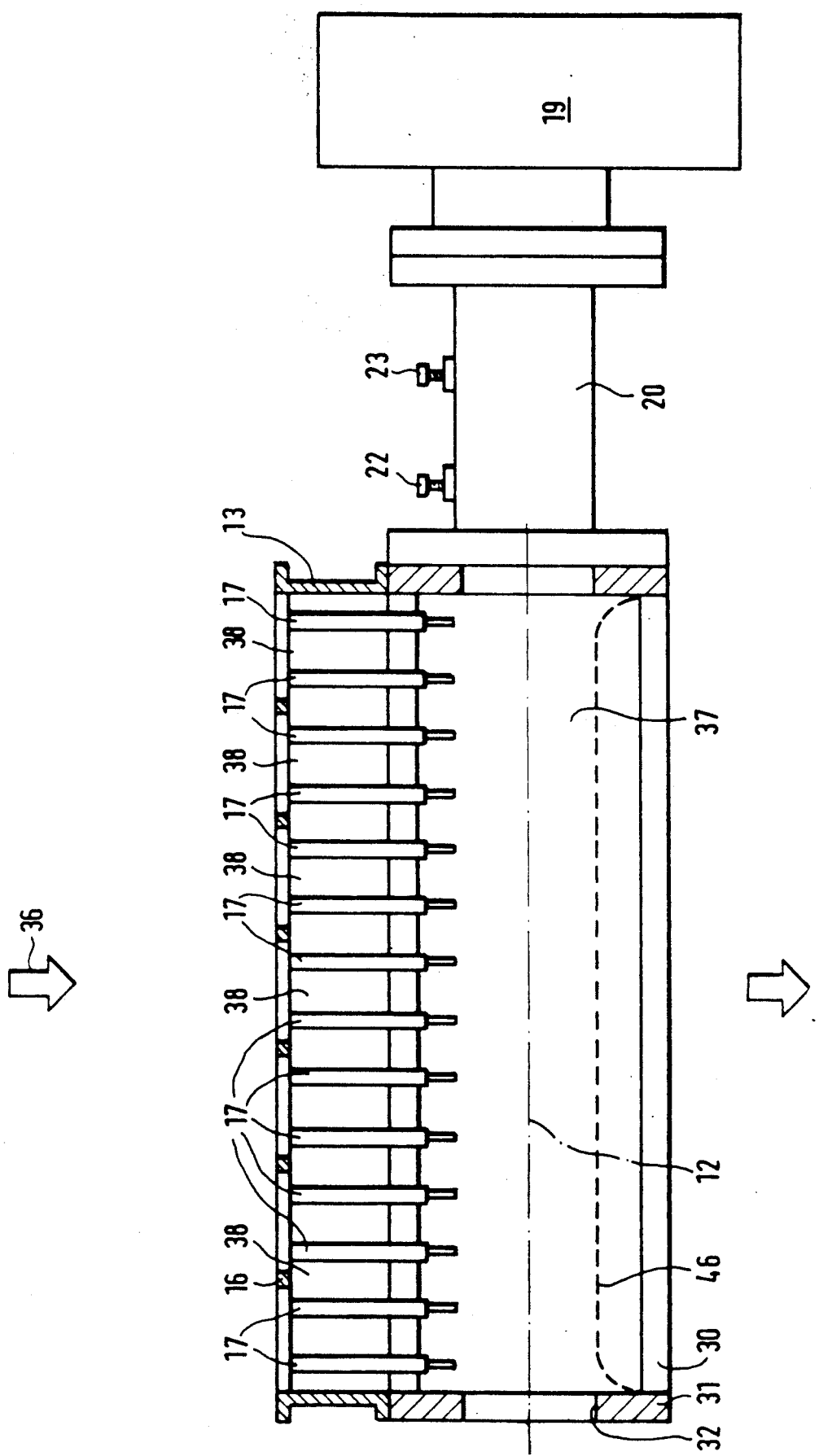

FIG. 4 shows a discharge space 37 of a microwave-excited gas laser having a transverse flow (arrow direction 36), which has a rectangular waveguide to hold the laser gas discharge gap 12. It consists of the following parts:

a rectangular waveguide which, at the same time, forms the discharge space 37;

a special laser gas inlet 13 with openings 38 for the gas 30 inlet, which is shaped as a waveguide with a rectangular cross section and which extends along almost the entire discharge space 37;

a short circuit 16 which contains the ignitors 17 and the ignitor holder and which, thanks to its design, prevents the escape of the microwaves;

a metal net 46 positioned in front of the laser gas outlet 30, which allows the gas flow but not the microwaves to pass;

two profiled inserts 33 on the narrow sides of the discharge space 37 to generate the electric field;

a vacuum-tight end plate 31 with a passage opening 32 that is concentric with respect to the laser radiation axis, which guarantees the sealing of the microwave field.

I claim:

1. In a process to electrically excite a laser gas, especially a $CO_2$-He-$N_2$ mixture in a discharge module having an axial laser gas discharge gap and a laser gas inlet area, wherein the gas is delivered at an angle, preferably perpendicular to the axial laser gas discharge gap, and the gas is ignited by means of bunched microwaves, the improvement being in that the microwaves are axially bunched into the laser gas discharge gap in the laser gas inlet area, the laser gas is ignited in the laser gas inlet area, and spreading the ignited laser gas with the microwaves in the direction of the optical axis and thus in the direction of the laser gas discharge to avoid the formation of wall boundary layers an to achieve a homogeneous large volume glow discharge.

2. Process according to claim 1 characterized in that the discharge module has a resonator, the laser gas discharge gap coincides with the optical axis of the resonator and the wave length of the microwaves is larger than twice the linear dimension of the laser gas discharge gap.

3. Process according to claim 1 or 2, characterized in reflecting the incident microwaves are reflected in the laser gas inlet by a short circuit, said microwaves and generating an electric ignition field strength for the laser gas in the area of at least one ignitor.

4. Process according to one of the claim 1 to 3, characterized in that the microwaves have a frequency of about 2.4 gHz.

5. In a process to excite a laser gas, especially a $CO_2$-He-$N_2$ mixture in a discharge module having an axial laser gas is delivered at an angle, preferably perpendicular to the axial laser gas discharge gap, and the gas is ignited by means of bunched microwaves, the improvement being in that there are several ignitors in the discharge module, the laser gas flows in and out transversely over most of the entire laser gas discharge gap, and reflecting the incident bunched microwaves axially entering the laser gas inlet from a short circuit and generating an electric ignition field strength for the laser gas in the area of the several ignitors to avoid the formation of wall boundary layers and to achieve a homogeneous large volume glow discharge.

6. A gas laser, especially a fast-flowing $CO_2$ high-power laser, including a discharge module having a laser gas inlet, for axially bunching the microwaves in the laser gas discharge gap in the area of the laser gas inlet microwaves in the direction of the optical axis and of the laser gas discharge gap, said gas laser comprising at least one discharge module through which laser gas flows and a microwave transmitter in the gigahertz range, whereby said discharge module and said microwave transmitter are connected to each other by means of a waveguide, said discharge module and said waveguide leading to said microwave transmitter being positioned axially behind each other, and at least one mirror being located between the incident microwaves and the laser gas in said discharge module thereby forming a resonator to axially bunch said microwaves.

7. A gas laser according to claim 6, characterized in that said waveguide has a rectangular cross section and at least one screw to form an impedance-adjusted waveguide gap.

8. A gas laser according to claim 6 or 7, in that said discharge module is a waveguide which has a round or rectangular cross section, and said laser gas inlet is a coaxial waveguide that is electrically sealed on one side and that has a short circuit.

9. A gas laser according to claim 8, characterized in that there is a dielectric discharge tube is positioned concentrically inside said wave guide and there is a seal, positioned between said laser gas inlet and the inlet of said discharge tube.

10. A gas laser according to claim 9, characterized in that said waveguide is sealed at a side facing the laser gas outlet with an end plate which shields the laser gas outlet and which shields the microwaves to the outside and which has a centered opening for said dielectric discharge tube to pass through.

11. A gas laser according to claim 8 characterized in that said coaxial waveguide is an ignitor holder and has at least one ignitor, which has an adjustable insertion depth in said coaxial waveguide, and which has a larger diameter at it short circuit than at it free end.

12. A gas laser according to claim 10, characterized in that there are metal insert inside said waveguide, which reduce the width of said waveguide to almost the cutoff width and to generate the electric field.

13. A gas laser according to claim 6 characterized in that said waveguide is sealed by a dielectric window and the space behind said window facing said laser gas discharge gap is larger than the cross section of said waveguide.

14. A gas laser according to claim 13, characterized in that said at least one mirror is a dielectric window.

15. A gas laser, especially a fast-flowing $CO_2$ high power laser in a discharge module having an axial laser gas discharge gap and a laser gas inlet area, wherein the gas is delivered at an angle to the axial laser gas discharge gap and the gas is ignited by means of bunched microwaves wherein the laser gas flows in and out transversely over most of the entire laser gas discharge gap with the incident bunched microwaves axially entering the laser gas inlet and are reflected from a short circuit and generate an electric ignition field strength for the laser gas in the area of several ignitors comprising at least one discharge space through which laser gas flows and a microwave transmitter in the gigahertz range, said discharge space and said microwave transmitter being connected to each other by means of a waveguide, said discharge space consisting of a waveguide with a rectangular cross section which is connected to a laser gas inlet which extends along substantially the entire discharge space and which is designed as a waveguide, and said waveguide being positioned axially to said discharge space for the axial bunching of the microwaves.

16. A gas laser according to claim 15, characterized in that laser gas inlet is a rectangular waveguide, and is equipped with a short circuit, which has an ignitor holder with openings to admit the gas flow.

* * * * *